UNITED STATES PATENT OFFICE.

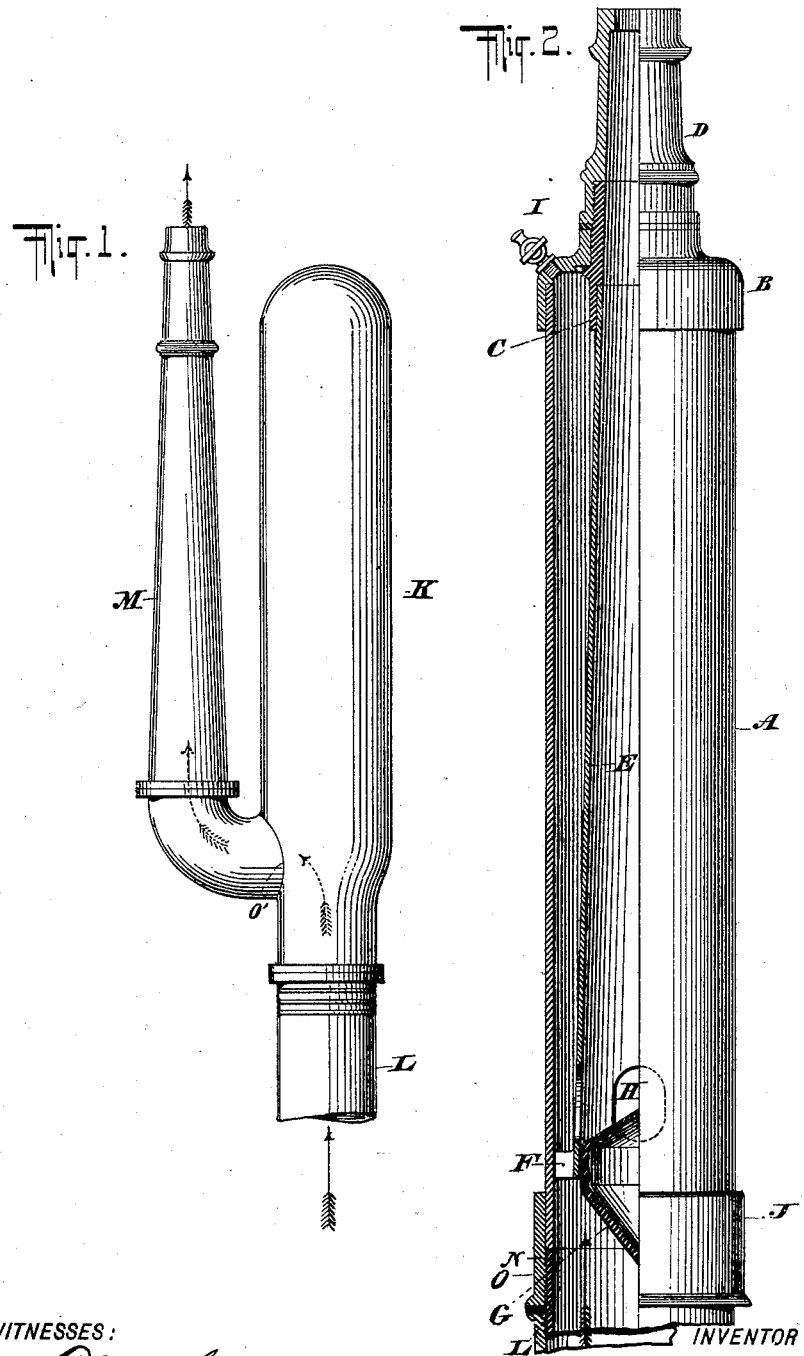

HORACE SEE, OF NEW YORK, N. Y.

CUSHIONING DEVICE FOR FLUID-CONDUITS.

SPECIFICATION forming part of Letters Patent No. 679,786, dated August 6, 1901.

Application filed December 5, 1900. Serial No. 38,722. (No model.)

*To all whom it may concern:*

Be it known that I, HORACE SEE, of the city, county, and State of New York, have invented a new and useful Improvement in Cushioning Devices for Fluid-Conduits, of which the following is a specification.

The object of my invention is to provide at or near the discharge-outlet of a fluid-conduit means for maintaining a substantially uniform pressure at said outlet and also of preventing injury to the conduit itself by reason of the sudden stoppage or starting of the fluid-current therein.

My invention consists in an elongated vessel everywhere hermetically closed except at an opening at one end, means for attaching to said open end a conduit adapted to convey fluid, and a delivery-pipe connected to said vessel at a point near said open end; also, in the various combinations hereinafter more particularly pointed out in the claims.

In the accompanying drawings, Figure 1 is an outside view of one form of my invention wherein the nozzle and air-chamber or cushioning-reservoir are in branch relation. Fig. 2 shows a preferable form of my device, partly in longitudinal section, wherein the fluid-conduit is inclosed in a shell which forms the air-chamber or cushioning-reservoir.

Referring first to Fig. 2, A is a pipe-section forming the outer shell of the nozzle and provided at one end with a flanged annular head B, which incloses a threaded thimble C. The thimble C carries the nozzle-tip D, and within the shell A it is secured to one end of the preferably tapering pipe E. On the inner periphery of the shell A may be formed or otherwise secured guide-wings, one of which is shown at F, which bear against the outer periphery of the pipe E. I preferably employ three such guide-wings equidistantly spaced apart around the inner periphery of the shell A. These guide-wings serve both to support and to center the internal pipe E. The inner end of the pipe E is closed by a plug G, secured within the pipe in any suitable manner. This plug G may be solid or it may be formed hollow of sheet metal. In the periphery of the pipe E and adjacent to the plug G are openings H. In the head B is placed a cock I, which may be used to relieve the air-pressure or permit of drainage of the shell A. A thimble N and coupling O are also provided at the open end of the shell A for the attachment of the main conduit L (shown broken away) thereto.

It will be observed that the pipe E extends nearly to that end of the vessel A which is connected to the main conduit L and that the openings H in said pipe are located as nearly as possible to its inner extremity. In this way the maximum capacity of air-chamber between the vessel A and the pipe E is obtained.

The operation of my device is as follows: The liquid entering the shell A first meets the plug G, which, as here shown, is formed with a conical extremity projecting beyond the end of the pipe E. The function of this conical end is to divert the fluid-current at once into the annular space between the shell A and the tube E. Now because of the velocity of the fluid rushing into this space its effect, due to its momentum, is strongly to compress the air within said space. As this space is hermetically closed at its farther end by the thimble C and head B, the inrushing fluid at once compresses the air therein, thus producing an air-cushion which first directly takes up the shock of impact and then reacting exerts its pressure upon the fluid, which, passing through the apertures H, enters the pipe E and so proceeds to the outlet at the nozzle-tip D. So long as the fluid-current under pressure continues air will be confined in the space between shell A and pipe E and will operate to maintain uniformity of discharge.

It will be noticed that the portion of the plug G which is within the pipe E is also conical, the purpose of which is to divert the fluid in a direction longitudinally the pipe E without the production of an eddy in the portion of the pipe in proximity to said plug.

I desire to call special attention to the fact that the air-chamber formed between the shell A and pipe E is in alinement with the direction of flow of the current, so that the effect of the current momentum is primarily to carry the fluid by its inertia past the openings H to compress the air and then after that momentum has been gradually checked by the elasticity of the air which has been compressed the current becomes wholly diverted into the pipe E. This construction of the device, with the axis of the air vessel in the line of flow of the current and with the entrance into the discharge-nozzle at an angle, and preferably a right angle, to that line of flow, is an important feature of this invention.

In the modification shown in Fig. 1 the air-vessel K is again directly in line with the main conduit L, and the nozzle-pipe M branches off from the air vessel K at substantially a right angle at the point O', which point is plainly located near the open end of said vessel, or, in other words, near the end to which the main conduit L is attached, so that the fluid after compressing the air in K takes the direction of the arrow through the nozzle M to the discharge-outlet. The nozzle M may be cast on the air-vessel K or secured to it by any suitable means, and the vessel K in turn is attached to the pipe L by an ordinary threaded coupling.

My invention is adapted to many uses and may be embodied in many different forms of apparatus, and therefore I do not limit myself to the specific form herein shown and described. It is also suited for use in connection with any current of fluid material, whether consisting wholly of a liquid or of a liquid containing more or less solid material in suspension. Thus I may use it in connection with conduits for water or other liquids or for liquids holding in suspension such materials as brewers' grains, salt, ashes, gravel, or earth.

I claim—

1. An elongated vessel everywhere hermetically closed except at an opening at one end, means for attaching to said open end a conduit adapted to convey fluid, and a delivery-pipe connected to said vessel at a point near said open end, substantially as described.

2. A tubular vessel hermetically closed at one end and open at the opposite end, means for connecting said open end to a conduit adapted to convey fluid and a delivery-pipe connected to said vessel at a point near said open end, substantially as described.

3. An elongated vessel hermetically closed at one end and open at the opposite end, means for connecting said open end to a conduit adapted to convey fluid, and a delivery-duct communicating with said vessel near said open end and having its connection at the place of communication placed substantially at right angles to the longitudinal axis of said vessel, substantially as described.

4. In combination with a conduit adapted to convey a fluid-current, a hermetically-closed chamber having its axis in prolongation of the axis of said conduit and a delivery-pipe communicating with said chamber near the junction of said chamber and said conduit, substantially as described.

5. In combination with a conduit adapted to convey a fluid-current, a hermetically-closed chamber having its axis in prolongation of the axis of said conduit, a delivery-pipe and a duct between said delivery-pipe and said chamber, the said duct communicating with said chamber near its junction with said conduit and having its axis at said place of junction substantially at right angles to the axis of said chamber, substantially as described.

6. In combination with a pipe closed at one end and open at the other, and provided with an aperture in its wall near said closed end, a shell of greater diameter than said pipe inclosing the same and hermetically joined thereto near the open extremity thereof and protruding beyond the closed end of said pipe, substantially as described.

7. The combination with a pipe open at one end and at its opposite extremity closed and provided with a conical extremity said pipe having an aperture in its wall near said closed end, a shell of larger diameter than said pipe and inclosing the same and said conical extremity, and hermetically secured to said pipe near the open end thereof, substantially as described.

8. The combination of the pipe D E closed at one end and near said end having apertures H, with the shell A surrounding and hermetically secured to said pipe near the open end thereof and of larger diameter than said pipe, substantially as described.

9. The combination of the tapered pipe D E closed at the larger end and near said end having apertures H, with the cylindrical shell A surrounding and hermetically secured to said pipe near the smaller end thereof, and of larger diameter than said pipe, substantially as described.

10. The combination of the pipe D E open at one end and closed at the other and provided with apertures H near said closed end, a plug G having a conical portion protruding beyond said pipe and a conical portion within said pipe and serving to close the said pipe, and a shell A of larger diameter than said pipe and inclosing the same and hermetically secured thereto near the open end thereof, substantially as described.

HORACE SEE.

Witnesses:
WILLIAM MOLLOY,
HARRY A. MOSER.